US010817071B2

(12) United States Patent
Rantala et al.

(10) Patent No.: US 10,817,071 B2
(45) Date of Patent: Oct. 27, 2020

(54) SELECTIVELY REDUCING REFLECTIVITY OF A DISPLAY

(71) Applicant: Nokia Technologies Oy, Espoo (FI)

(72) Inventors: Enrico Rantala, Berkeley, CA (US); Mika Kasslin, Espoo (FI); Janne Marin, Espoo (FI); Olli Alanen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/336,419

(22) PCT Filed: Sep. 15, 2017

(86) PCT No.: PCT/IB2017/055612
§ 371 (c)(1),
(2) Date: Mar. 25, 2019

(87) PCT Pub. No.: WO2018/060807
PCT Pub. Date: Apr. 5, 2018

(65) Prior Publication Data
US 2019/0227637 A1  Jul. 25, 2019

(30) Foreign Application Priority Data
Sep. 30, 2016  (EP) .................................... 16191685

(51) Int. Cl.
*G06F 3/01* (2006.01)
*G02B 27/01* (2006.01)
(Continued)

(52) U.S. Cl.
CPC .............. *G06F 3/017* (2013.01); *A47G 1/02* (2013.01); *E03C 1/055* (2013.01); *E03C 1/057* (2013.01);
(Continued)

(58) Field of Classification Search
None
See application file for complete search history.

(56) References Cited

U.S. PATENT DOCUMENTS

| 5,243,452 A | 9/1993 | Baur |
| 6,560,027 B2 | 5/2003 | Meine |

(Continued)

FOREIGN PATENT DOCUMENTS

| CN | 103479140 A | 1/2014 |
| CN | 204931078 U | 1/2016 |

(Continued)

OTHER PUBLICATIONS

Chaudhary, "Finger-Stylus for Non Touch-Enable Systems", Journal of King Saud University—Engineering Sciences, vol. 29, No. 1, Jan. 2017, 9 pages.

(Continued)

*Primary Examiner* — Sepehr Azari
(74) *Attorney, Agent, or Firm* — Alston & Bird LLP

(57) ABSTRACT

A method, apparatus and computer program product are provided for displaying messages by reducing a reflectivity of a display. A display, such as a smart mirror, provides reflective properties and digital information. The reflectivity of some portions of the display may be altered such that the display provides the visual effect of steam. By varying the reflectivity in different portions of the display, messages may be provided via the display so as to appear written in the steam. Trigger actions, such as a user entering the vicinity, the detected sound of miming water, and/or the like, may cause the visual effect of steam or display of the message. A user may provide a message by a hand gesture, or writing the message in the air and see the message at is provided via a display. Users may transmit messages to other users, and may view received messages in the display.

20 Claims, 7 Drawing Sheets

(51) Int. Cl.
    *G09F 13/12*    (2006.01)
    *A47G 1/02*     (2006.01)
    *G02B 5/08*     (2006.01)
    *G06F 3/16*     (2006.01)
    *G06F 3/03*     (2006.01)
    *E03C 1/05*     (2006.01)
    *G09F 13/18*    (2006.01)

(52) U.S. Cl.
    CPC ........... *G02B 5/08* (2013.01); *G02B 27/0101* (2013.01); *G06F 3/0304* (2013.01); *G06F 3/167* (2013.01); *G09F 13/12* (2013.01); *G02B 2027/0138* (2013.01); *G02B 2027/0187* (2013.01); *G06F 2203/04804* (2013.01); *G09F 2013/184* (2013.01)

(56) References Cited

U.S. PATENT DOCUMENTS

| | | |
|---|---|---|
| 7,894,836 B1 | 2/2011 | Fuoss et al. |
| 2001/0050669 A1 | 12/2001 | Ogawa |
| 2004/0098137 A1 | 5/2004 | Hollemans |
| 2004/0163105 A1 | 8/2004 | Thursfield |
| 2013/0145272 A1 | 6/2013 | Boggie et al. |
| 2014/0282159 A1* | 9/2014 | Lee .................. G06F 3/0481 715/768 |
| 2016/0093081 A1 | 3/2016 | Kim et al. |

FOREIGN PATENT DOCUMENTS

| | | |
|---|---|---|
| EP | 2778884 A2 | 9/2014 |
| KR | 20150108571 A | 9/2015 |
| WO | 2016/005333 A1 | 1/2016 |

OTHER PUBLICATIONS

Vikram et al., "Handwriting and Gestures in the Air, Recognizing on the Fly", Extended Abstracts, Apr. 27-May 2, 2013, pp. 1179-1184.

"9 Minority Report Inspired Touchless Technology", Hongkiat, Retrieved on Mar. 15, 2019, Webpage available at : https://www.hongkiat.com/blog/motion-sensing-gadgets/.

Extended European Search Report received for corresponding European Patent Application No. 16191685.3, dated Feb. 10, 2017, 10 pages.

International Search Report and Written Opinion received for corresponding Patent Cooperation Treaty Application No. PCT/IB2017/055612, dated Jan. 19, 2018, 13 pages.

"iPhone Apps Round-Up: Fog-and-Draw Apps", Macworld, Retrieved on Mar. 15, 2019, Webpage available at : https://www.macworld.com/article/1137811/dec30apps_roundup_html.

Ganady et al., "The Mind-Mirror: See Your Brain in Action in Your Head Using EEG and Augmented Reality", IEEE Virtual Reality (VR), Mar. 29-Apr. 2, 2014, pp. 33-38.

Office action received for corresponding European Patent Application No. 16191685.3, dated Sep. 26, 2018, 7 pages.

"GM Advanced Tech Window—Steam Effect", Youtube, Retrieved on Mar. 15, 2019, Webpage available at : https://www.youtube.com/watch?v=Odlia553wVU.

Office action received for corresponding European Patent Application No. 16191685.3, dated Apr. 25, 2019, 7 pages.

Summons to Attend Oral Proceedings for European Application No. 16 191 685.3 dated Oct. 10, 2019, 10 pages.

Summons to Attend Oral Proceedings for European Application No. 16 191 685.3 dated May 14, 2020, 12 pages.

* cited by examiner

SELECTIVELY REDUCING REFLECTIVITY OF A DISPLAY

RELATED APPLICATION

This application was originally filed as PCT Application No. PCT/IB2017/055612 filed Sep. 15, 2017 which claims priority benefit from 16191685.3 filed Sep. 30, 2016.

TECHNOLOGICAL FIELD

An example embodiment of the present disclosure relates generally to user interfaces, and more particularly, to a method, apparatus and computer program product for displaying messages by selectively reducing a reflectivity of a display.

BACKGROUND

The advancement of computing technology has led to smart devices being used in many aspects of life, and many individuals operating numerous different types of smart devices to satisfy their desire for technology and information. Many users, however, wish to access digital information in a more seamless manner that is integrated with their everyday tasks and activities. Integrating technology into other products used in everyday life may enable users to access news, social networks, and the like while accomplishing other tasks.

A smart mirror, sometimes installed above a bathroom sink vanity, may provide the functions of a standard mirror (e.g., enabling a user to view their reflection, comb their hair, brush their teeth, etc.), while also providing personalized widgets and other digital information. While devices such as the smart mirror provide instant access to health information, news, social networks, and the like, some users may desire more realistic and creative methods to communicate with users.

BRIEF SUMMARY

A method, apparatus, and computer program product are therefore provided for displaying messages by selectively reducing a reflectivity of a display.

Example embodiments may provide a realistic and visual characteristic of steam to be provided on a display, such as the display of a smart mirror. The visual characteristic of steam may appear as a blurring, clouding, coloring, darkening, or any other visual effect applied to the display such that the reflective properties are reduced. The reduction in reflectivity may be initiated in response to a trigger action.

For example, when hot water is run in a bathroom, a mirror (e.g., a standard mirror having no digital or electronic components) will often become covered in steam. As the mirror steams, an individual's ability to see their reflection may be reduced. The steam may in some instances become so heavy that the mirror is no long reflective. In some instances, an individual may use a finger or other object to "write" in the steam, effectively wiping the steam clear in the pattern of a message.

Example embodiments may therefore create a similar realistic effect on a display, such as a smart mirror, by altering the reflective properties of the display. For example, in response to a trigger action, such as a faucet being turned on, example embodiments may reduce the reflectivity of the display to create a visual effect of steam. As a message is transcribed (e.g., in the air with hand motions) or dictated, example embodiments may further alter reflective qualities such that the message is provided on the display. Given the realistic qualities provided by example embodiments, the message may appear to be written in steam.

A method is provided that comprises receiving a trigger action indication in response to a trigger action occurring in an environment of a display. The method further includes, in response to the trigger action indication and based on a message, determining, with a processor, a first portion of the display comprising a first set of pixels and a second portion of the display comprising a second set of pixels. The method further includes causing the display to selectively reduce a reflectivity of the display by reducing the reflectivity of the first portion of the display relative to the second portion of the display such that the display provides the message.

In some examples, the display is comprised by a smart mirror configured to provide a visual characteristic of steam. The message may be received via a user input provided in the environment of the display. The user input may be provided via a detected motion, and the method further comprises modifying the first set of pixels and the second set of pixels such that display provides the message progressively as the user input is provided. In some examples, the user input is a voice input.

According to example embodiments, the message is retrieved from a memory device. In some examples, the message is received via a first user interface prior to the message being provided at the display. The method may further include retrieving the message from a memory device, wherein the display providing the message is remote from the first user interface via which the message was received.

The trigger action may comprise a change in temperature, humidity, or any combination thereof in the environment of the display. In some embodiments, the trigger action comprises a detected sound. The method may further include causing the reflectivity of the first portion to gradually change such that the message provided gradually fades. In some examples, the method includes causing the reflectivity of the second portion to gradually change such that the message provided gradually fades.

An apparatus is provided comprising at least one processor and at least one memory including computer program code with the at least one memory and the computer program code configured to, with the processor, cause the apparatus to at least receive a trigger action indication in response to a trigger action occurring in an environment of a display. The at least one memory and the computer program code may be further configured to cause the apparatus to, in response to the trigger action indication and based on a message, determine a first portion of the display comprising a first set of pixels and a second portion of the display comprising a second set of pixels. The at least one memory and the computer program code may be further configured to cause the apparatus to cause the display to selectively reduce a reflectivity of the display by reducing the reflectivity of the first portion of the display relative to the second portion of the display such that the display provides the message.

An apparatus is provided that comprises at least one display, at least one processor, and at least one memory. The at least one display comprises at least one reflective component. The memory comprises computer program code, the at least one memory and the computer program code configured to, with the processor, cause the apparatus receive a trigger action indication in response to a trigger action occurring in an environment of the display. The at least one memory and the computer program code may be further configured to cause the apparatus to, in response to the trigger action indication and based on a message, determine a first portion of the display comprising a first set of pixels and a second portion of the display comprising a second set of pixels. The at least one memory and the computer program code may be further configured to cause the apparatus to, cause the display to selectively reduce a reflectivity of the display by reducing the reflectivity of the first portion of the display relative to the second portion of the display such that the display provides the message. In an embodiment, the at least one display further comprises an electronic digital display component aligned with the at least one reflective component, wherein the reflectivity of the first portion of the display is reduced by changing a property of the first set of pixels on the electronic digital display component.

A computer program product is provided that comprises at least one non-transitory computer-readable storage medium having computer-executable program code instructions stored therein with the computer-executable program code instructions comprising program code instructions to at least receive a trigger action indication in response to a trigger action occurring in an environment of a display. The computer-executable program code instructions may further comprise program code instructions to, in response to the trigger action indication and based on a message, determine a first portion of the display comprising a first set of pixels and a second portion of the display comprising a second set of pixels. The computer-executable program code instructions may further include program code instructions to cause the display to selectively reduce a reflectivity of the display by reducing the reflectivity of the first portion of the display relative to the second portion of the display such that the display provides the message.

An apparatus is provided comprising means for receiving a trigger action indication in response to a trigger action occurring in an environment of a display. The apparatus further includes means for, in response to the trigger action indication and based on a message, determine a first portion of the display comprising a first set of pixels and a second portion of the display comprising a second set of pixels. The apparatus may further include means for causing the display to selectively reduce a reflectivity of the display by reducing the reflectivity of the first portion of the display relative to the second portion of the display such that the display provides the message.

BRIEF DESCRIPTION OF THE DRAWINGS

Figure 1:
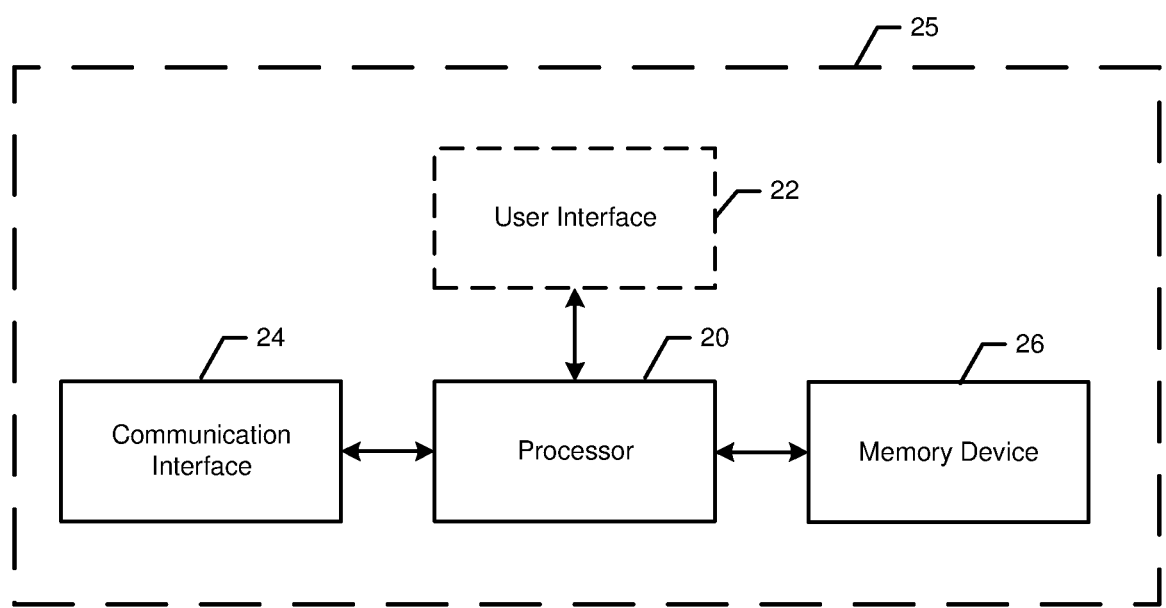
Figure 2:
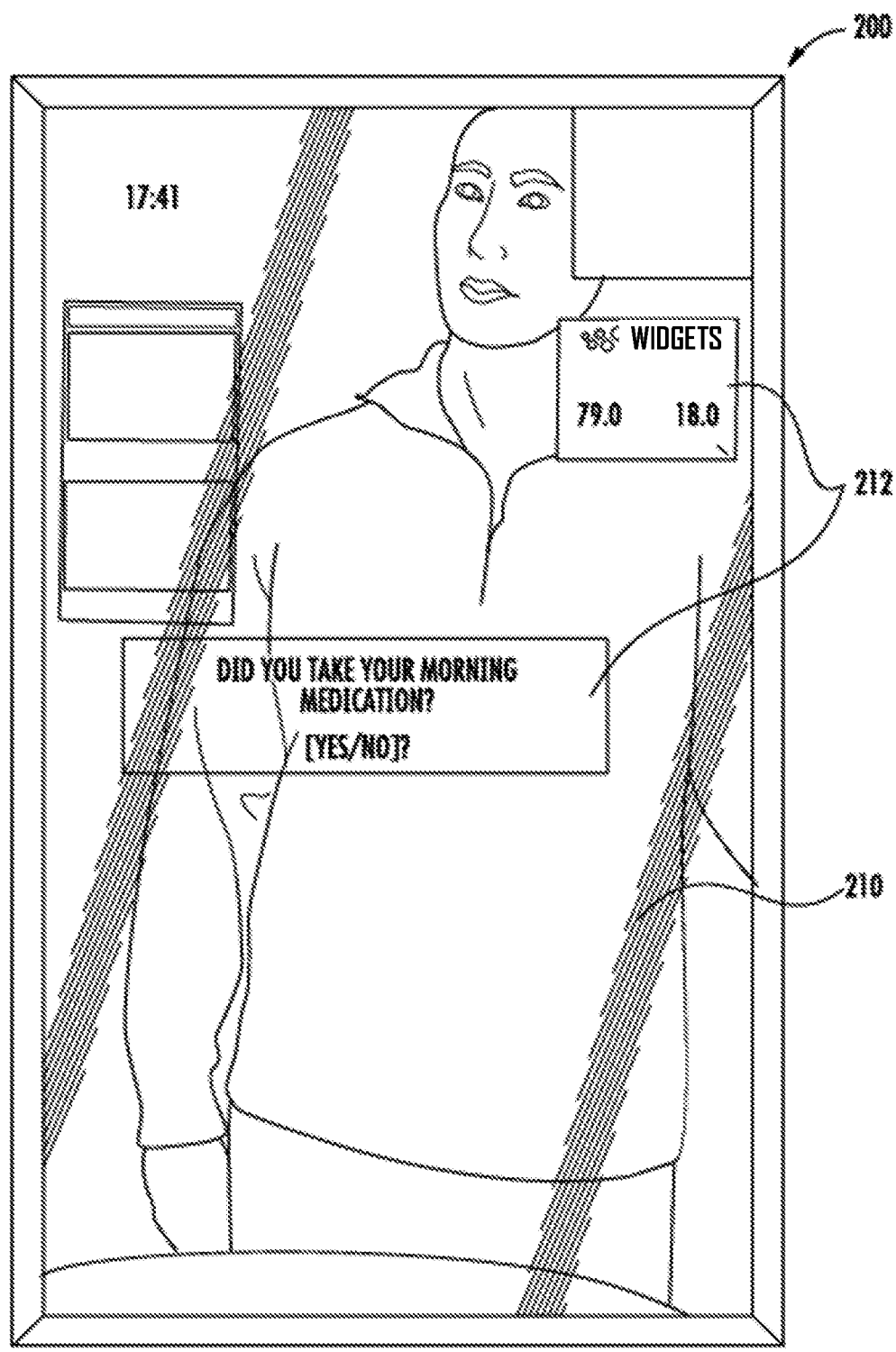
Figure 3:
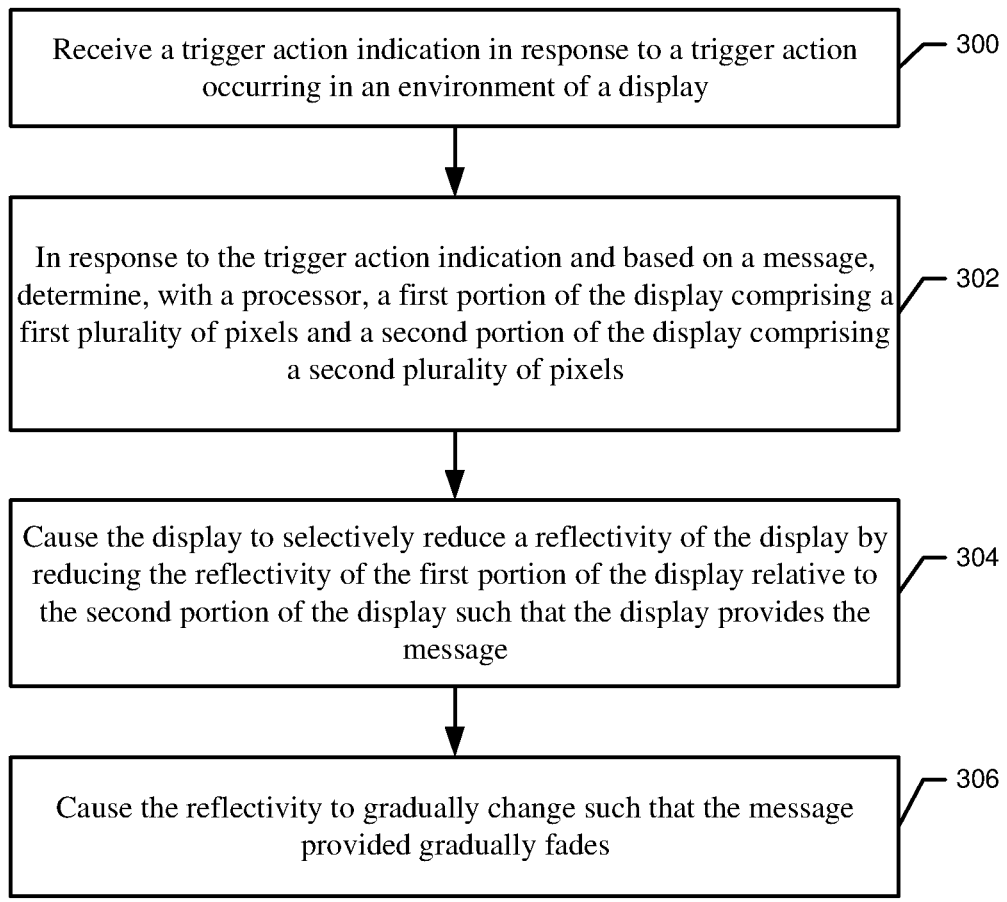
Figure 5:
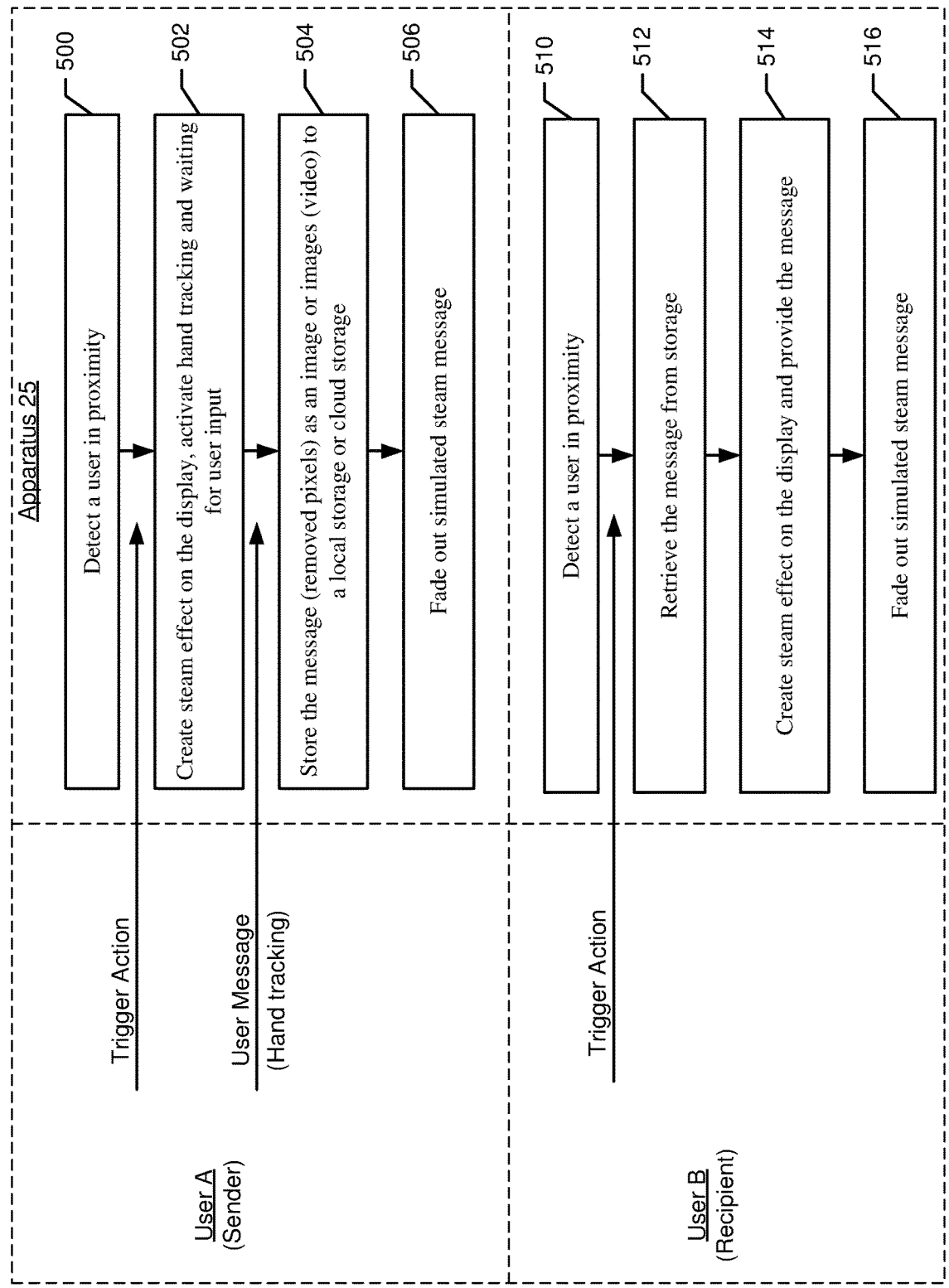
Figure 6B:
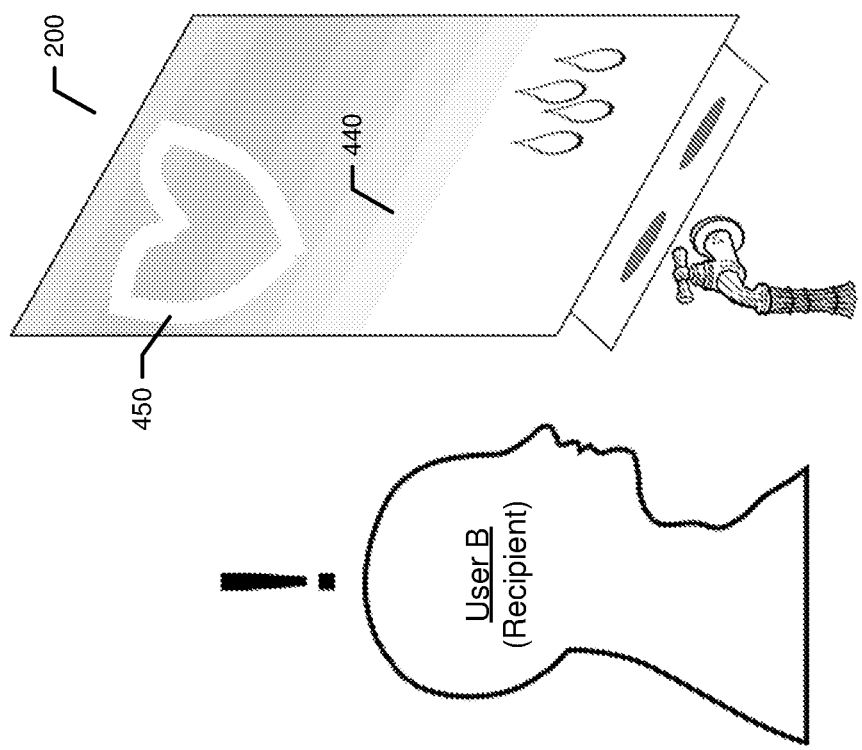
Figure 6A:
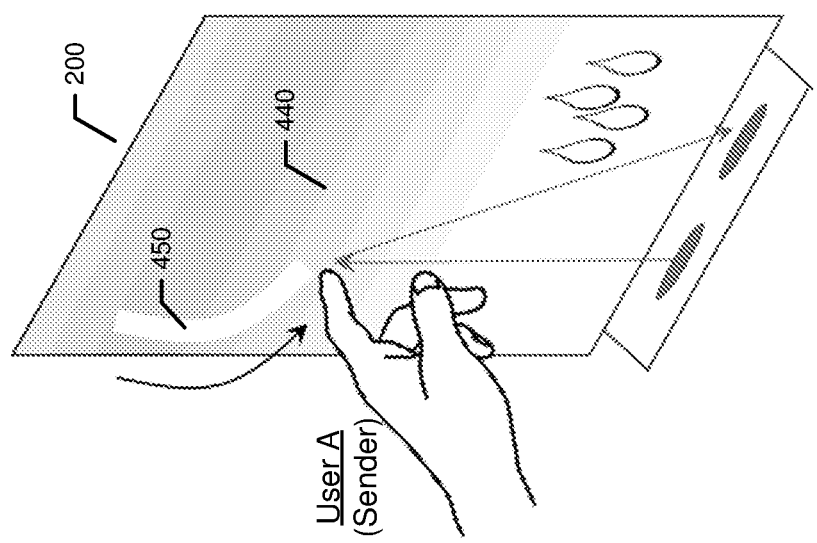

Having thus described certain example embodiments of the present disclosure in general terms, reference will hereinafter be made to the accompanying drawings which are not necessarily drawn to scale, and wherein:

FIG. 1 is a block diagram of an apparatus that may be configured to implement example embodiments of the present disclosure;

FIG. 2 is a display in accordance with example embodiments of the present disclosure;

FIG. 3 is a flowchart illustrating operations performed in accordance with example embodiments of the present disclosure;

FIGS. 4A-4D illustrate example displays in their respective environments, in accordance with example embodiments of the present disclosure;

FIG. 5 is a flowchart illustrating operations performed in accordance with example embodiments of the present disclosure; and FIGS. 6A-6B illustrate example displays in their respective environments, in accordance with example embodiments of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As described below, a method, apparatus and computer program product are provided for displaying messages by reducing a reflectivity of a display. In this regard, example embodiments may provide visual effects to a display, such as a smart mirror, such that the appearance of steam is provided on the display. A message may then be provided in the steam such as by creating an appearance of the steam being wiped away in the pattern of the message. Example embodiments therefore provide a creative and natural method for a user to input a message, and for displaying messages to users. In some cases, reducing reflectivity for displaying messages and/or receiving messages may be referred to herein as "simulated steam." In some cases, simulated steam includes reducing reflectivity by, for example, providing grayscale on the display that interact with a user as if it was steam.

Referring to FIG. 1, apparatus 25 may include or otherwise be in communication with a processor 20, communication interface 24, and memory device 26. As described below and as indicated by the dashed lines in FIG. 1, in some embodiments, the apparatus 25 may also optionally include a user interface 22.

In some examples, apparatus 25 may be implemented as a server or distributed system for generating data to be displayed on a display, such as a smart mirror. In some examples, apparatus 25 need not necessarily be embodied by a server, and may be embodied by a wide variety of devices including personal computers, work stations, or mobile terminals, such as laptop computers, tablet computers, smartphones or any combination of the aforementioned, and other types of voice and text communications systems. In some examples, apparatus 25 may be embodied by a smart mirror. The smart mirror may comprise a display which apparatus 25 may control according to example embodiments. An example display is described in further detail with respect to FIG. 2 below.

In some embodiments, the processor 20 (and/or co-processors or any other processing circuitry assisting or otherwise associated with the processor 20) may be in communication with the memory device 26 via a bus for passing information among components of the apparatus 25. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present disclosure. For example, the memory device 26 could be configured to buffer input data for processing by the processor 20. Additionally or alternatively, the memory device 26 could be configured to store instructions for execution by the processor 20. In some embodiments, the memory device 26 may be configured to store messages to be provided via the display according to example embodiments provided herein.

The apparatus 25 may, in some embodiments, be embodied in various devices as described above (e.g., server, work station, and/or the like). In some embodiments, apparatus 25 may embody the smart mirror and/or associated display, and the processor 20 may be further configured to implement the functionality described herein in addition to other functions of the smart mirror and/or associated display.

However, in some embodiments, the apparatus 25 may be embodied as a chip or chip set. In other words, the apparatus 25 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 25 may therefore, in some cases, be configured to implement an embodiment of the present disclosure on a single chip or as a single "system on a chip." As such, in some cases, a chip or chipset may constitute means for performing one or more operations for providing the functionalities described herein.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present disclosure while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed, such as controlling the smart mirror and/or associated display. However, in some cases, the processor 20 may be a processor of a specific device (e.g., a mobile terminal or network entity) configured to employ an embodiment of the present disclosure by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the apparatus 25. In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms.

In some embodiments, such as instances in which the apparatus 25 is embodied by a user device, such as the smart mirror and/or associated display, the apparatus 25 may include a user interface 22 that may, in turn, be in communication with the processor 20 to receive an indication of a user input (e.g., a message) and/or to cause provision of an audible, visual, mechanical or other output to the user. As such, the user interface 22 may include, for example, a keyboard, a mouse, a joystick, a display, a touch screen(s), touch areas, soft keys, a microphone, a speaker, a motion sensor, a radar detection device, a hygrometer, other environmental context sensors, other input/output mechanisms, or any combination thereof. Alternatively or additionally, the processor 20 may comprise user interface circuitry configured to control at least some functions of one or more user interface elements such as, for example, a speaker, ringer, microphone, display, and/or the like. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like). In some embodiments, the user interface 22 may comprise the smart mirror and/or associated display. As described in further detail herein, the user interface 22 may be configured for receiving messages by user input, and/or providing messages based on varying amounts of reflectivity, as directed by processor 20.

FIG. 2 is an illustration of an example display 200 that may be controlled and/or embodied by apparatus 25, according to example embodiments. In this regard, the display 200 may be a smart mirror, may comprise a smart mirror, or may be comprised by a smart mirror. The smart mirror is a mirror for displaying personalized widgets, health information and/or the like. The smart mirror may comprise the display 200, and any associated circuitry and components described herein, such as apparatus 25, processor 20, communication interface 24, and/or memory device 26.

The display 200 may comprise a reflective component (e.g., mirror, glass or window) that may be semi-transparent and provides reflective qualities, and an electronic digital display component, such as a liquid-crystal display. The electronic digital display component may lie behind or be embedded within the reflective component. In an example embodiment, the electronic digital display is aligned with the reflective component and is positioned in front of the reflective component, that is, closer to the user. In the absence of the presentation of information, the electronic digital display may be transparent such that reflections from the reflective component are unimpeded.

The user's reflection 210 in FIG. 2 is indicative of the reflective quality of the reflective component. Widgets 212 are provided by the electronic digital display component. The display 200 may therefore enable a user to see both a reflection of the environment in which the display 200 is located, and information provided by the electronic digital display component.

The electronic digital display may be controlled by a processor, such as processor 20, to display information and to control brightness, coloring, and other aspects of the electronic digital display. As the properties of the electronic digital display are altered, the reflectivity of the display 200 that is visible to the user may change. For example, as the electronic digital display provides darker portions, images, or pixels, the reflectivity of the reflective component aligned with the darker pixels may appear to decrease from the perspective of the user such that the reflection of the environment is less visible in the specific portion of the display 200. In this regard, as apparatus 25 (such as with processor 20) controls the various pixels of the electronic digital display, the reflectivity of the display 200 may appear to increase or decrease (or, in some example, may remain the same) from the perspective of the user. In some examples, the reflectivity of a portion or all of the reflective component may be eliminated, but for simplicity the component is nevertheless referred to as the reflective component.

As such, and described in further detail according to the example embodiment provided herein, the display 200 may therefore be configured to provide a visual characteristic of steam by reducing reflectivity.

In some examples, cameras, microphones, motion detectors, radar detection devices, radios, sensors, and/or the like, may be affixed to, embedded within, or concealed behind any component of the display 200. Any such components may be considered a part of the user interface 22, and may be configured to communicate with processor 20 (such as by communication interface 24).

Any reference to display 200 or the term 'display' provided herein may refer to the reflective component, electronic digital display component, or any combination thereof. For example, the display 200 may be considered a smart mirror. Accordingly, the apparatus 25 may control any components of the display 200 according to example embodiments.

FIG. 3 is a flowchart of operations performed by apparatus 25 according to example embodiments. As shown by operation 300, apparatus 25 may include means, such as the processor 20, user interface 22, communication interface 24, or the like, for receiving a trigger action indication in response to a trigger action occurring in an environment of a display, such as display 200. The environment of the display 200 may include the room or any area surrounding or in the vicinity of the display 200, such as an area from which the display 200 is visible, an area in which speech is received by the display, an area having common environmental conditions, e.g., humidity, with the display or the like.

The trigger action indication may be any indication received by apparatus 25, such as data and/or the like, indicating to perform the operations as described herein, such as creating the visual effect of steam on the display 200 and/or causing a message to be provided. The trigger action indication may be received from the user interface 22, for example, in response to a trigger action such as a user powering on a device, including but not limited to the display 200. In some examples, the trigger action may include an explicit request to check for messages, or a request to access an interface configured for providing messages. The trigger action may include a voice command, action occurring in the environment of the display 200, and/or the like.

In some embodiments, the trigger action may include detection of a user coming within a range or proximity (e.g., within a threshold distance of) the display 200. The trigger action may therefore be generated in response to detection of presence by a local radio such as Bluetooth® or Wi-Fi Aware™ systems. For example, a user entering the environment of the display 200 may be in possession of a device which communicates to apparatus 25 the user or device identity. The trigger action indication may therefore, in some embodiments, include an identifier of a user or device.

As another example, the trigger action may be generated in response to facial recognition of a user in the environment of the display 200, such as that performed with a camera, which may or may not be embedded within a housing of the display 200.

Figure 4B:
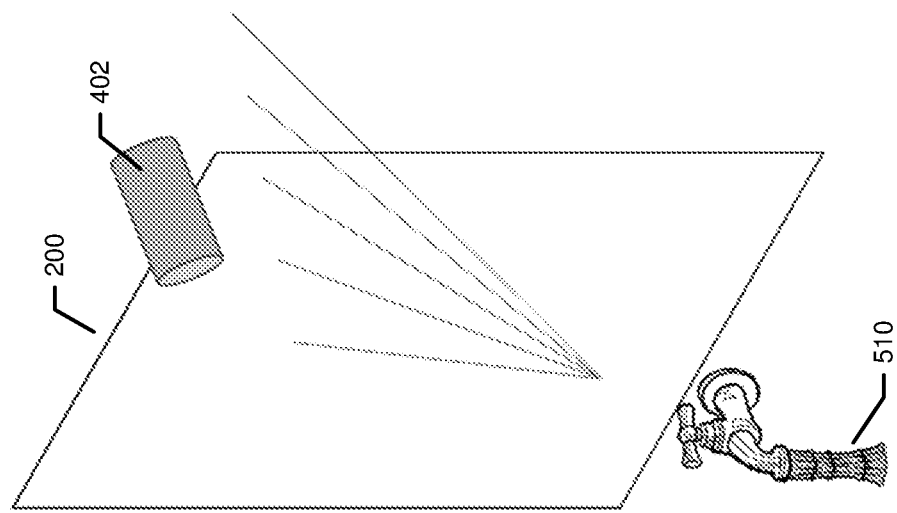
Figure 4A:
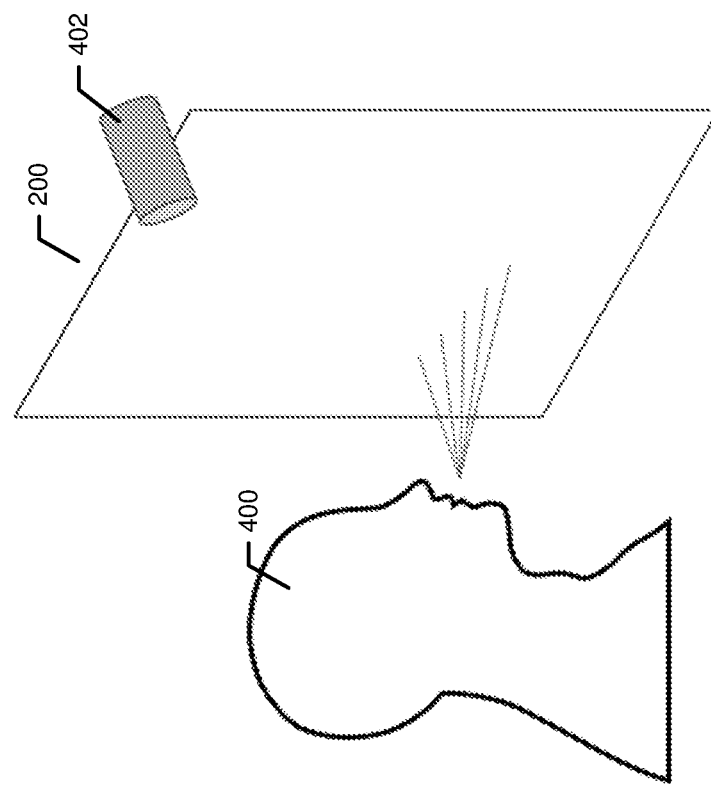
Figure 4D:
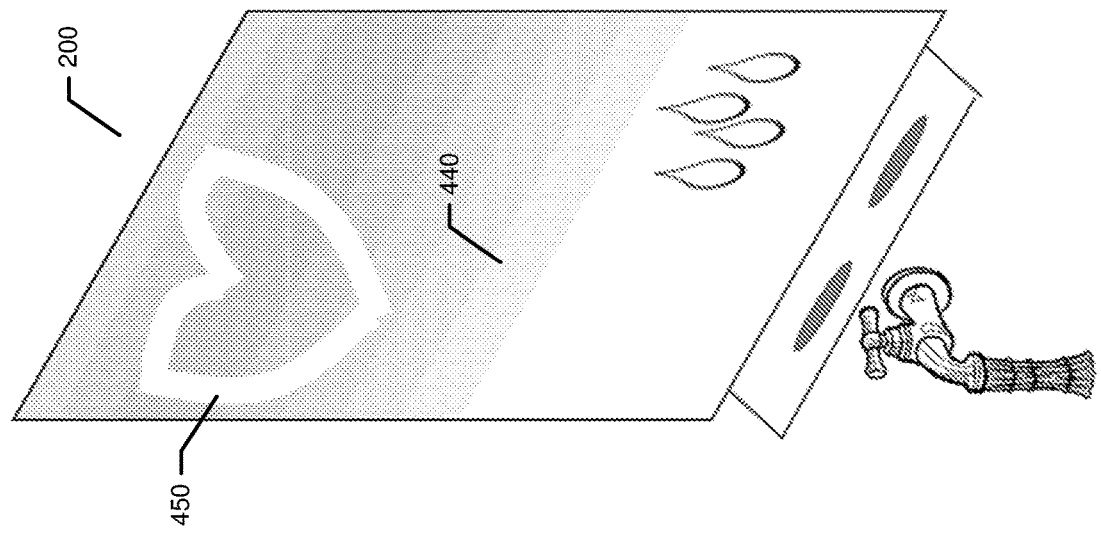
Figure 4C:
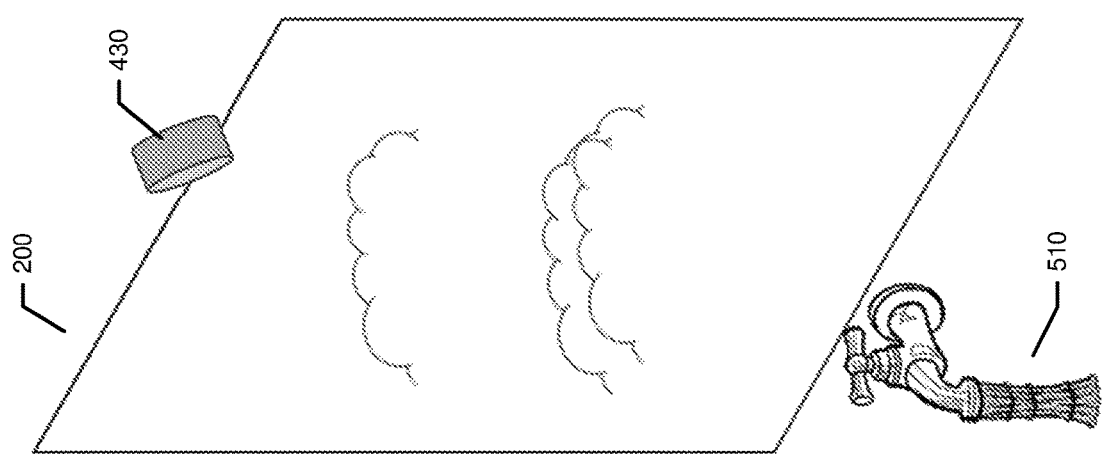

FIGS. 4A-4C illustrate example displays in their respective environments in which trigger action indications have been received by apparatus 25. As illustrated in FIG. 5A, a user 400 blows on the display 200, and the microphone 402 detects the blowing noise. The apparatus 25, such as the processor, may identify the blowing noise as a trigger action.

As another example, a user may provide a voice command in the environment of the display 200. A microphone 402 detects the voice commands and provides a trigger action indication to apparatus 25. The voice command interpreted as a trigger action may comprise any recognizable voice, and/or a specific word or command may be spoken by the user and identified by the apparatus 25, such as the processor, as a trigger action indication.

As illustrated in FIG. 4B, as another example, a trigger action indication may be received by apparatus 25 in response to a faucet being turned on in the environment of the display 200. The trigger action may therefore include the sound of the faucet being turned on and/or the sound of running water. In an example embodiment, apparatus 25 may determine how quickly the reflectivity is changed based on the intensity and/or volume of a sound, similar to a manner in which a mirror or window would actually steam up due to steam or running hot water (e.g., a faucet running at a high volume may cause a mirror to steam up more quickly relative to a faucet running at a lower volume). The apparatus 25, such as the processor, may therefore compare the sounds detected by microphone 402 and assess whether a detected sound comprises a quality indicative of a trigger action. In this regard, the trigger action may include any detected sound, or pattern of sounds.

As yet another example, FIG. 4C illustrates that a trigger action indication may be received based on detected humidity, steam, water, and/or the like in the environment of display 200. In some embodiments, the trigger action may comprise a change in temperature, humidity, or any combination thereof. A hygrometer 430 may detect or sense any of the aforementioned conditions in the environment, and the trigger action may be generated accordingly. In some examples, the trigger action may be generating in response to detecting that the temperature and/or humidity has reached a threshold minimum or maximum, or the trigger action may be generated based on determining that a change from a prior humidity and/or temperature satisfies a threshold amount.

In some embodiments, the trigger action may be generated in response to a detected movement by a motion sensor or a radar detection device. The trigger action may therefore include movement in the environment of the display 200, such as the movement caused by a user moving into the room of the display 200 or in front of the display 200.

Returning to FIG. 3, as shown by operation 302, apparatus 25 may include means, such as the processor 20, user interface 22, communication interface 24, memory device 26, or the like, for in response to the trigger action indication and based on a message, determining a first portion of the display comprising a first set of pixels and a second portion of the display comprising a second set of pixels.

The message may include text, image data, and/or any information that can be provided via the display 200. The message may, for example, include an indication of a set of pixels, which if distinguished from the other pixels on a display, may indicate associated information to a user.

The message may be received from and/or accessed on memory device 26. In this regard, the message may be predefined or generated by apparatus 25, such as the processor.

In some examples, the message may be received via user input provided to a user interface, such as user interface 22. The user interface 22 may be in the environment of the display 200 or affixed to the display 200. For example, the user interface 22 may include a microphone configured to receive a voice input indicative of the message. The user interface 22 may additionally or alternatively include a motion sensor or a radar detection device configured to detect a hand gesture input or tracing motion indicative of the message. In some examples, user interface 22 may include a touch screen configured for receiving messages provided by a user. As such, a user may effectively write the message on or slightly above the display, much in the same way in which a user may write on a conventional foggy mirror.

In some examples, the user interface 22 by which the message is provided may be remote from the display 200, and may be received via communication interface 24 and/or memory device 26.

The first and second portions of the display 200 (and their respective first and second sets of pixels) may be determined such that the first portion represents a background, and the second portion represents the message. For example, see FIG. 4D. The first portion 440 of the display 200 is the background portion. The first portion 440 appears in the drawing as gray and/or shaded, but the properties and corresponding visual appearance of the first portion is described in further detail below. The apparatus 25, such as the processor, may determine the second portion 450 of the display based on the message. In this example, the message is a heart such as one "drawn" by a user.

Apparatus 25, such as the processor, may determine the first and second pluralities of pixels of the respective portions using any method, such as those described below. In some examples, the message may include or may be associated with data indicating which pixels or coordinates of a particular display 200 are included in the second portion.

As another example, the apparatus 25, such as the processor and/or the memory device, may access the message, which may be stored as text or image data, process the message, and identify the second set of pixels accordingly such that the second set of pixels correspond to and reproduce the message. The size and location of the message as represented by the second set of pixels may be dependent upon the user input in an instance in which the user interacts with the display 200 to initially provide the message, such as by sizing and locating the message in an identical manner to that in which the message was originally defined by the user. Alternatively, the size and location of the message may be predefined, either generally for the display or more specifically for individual messages. In addition, the first and second sets of pixels determined by apparatus 25 may be dependent on the size, resolution, and/or other properties of the display 200.

The first and second sets of pixels are generally mutually exclusive. In some examples, the first portion of the display 200 comprising the first set of pixels may be determined to be all the pixels of the display 200 other than the second set of pixels comprised by the second portion of the display. Apparatus 25, such as the processor, may therefore, in some embodiments, determine the second portion based on the message, and determine the first portion as the remainder of the pixels not included in the second portion.

Continuing to operation 304, apparatus 25 may include means, such as the processor 20, user interface 22, communication interface 24, memory device 26, or the like, for causing the display to selectively reduce a reflectivity of the display by reducing the reflectivity of the first portion of the display relative to the second portion of the display such that the display provides the message. As used herein, reductions in the reflectivity of the display refer to the perceived reflectivity of the display from the perspective of a viewer and not necessarily the reflectivity of the reflective component itself since the reflective component may remain uniformly reflective, but the electronic digital display may at least partially obscure portions of the reflective component such that the perceived reflectivity of those portions appear to be reduced or eliminated.

As described with respect to FIG. 4D, first portion 440 is illustrated in the drawing as gray and/or shaded. According to example embodiments, the apparatus 25, such as with processor 20, selectively reduces the reflectivity of the display 200 in the first portion. The apparatus may selectively reduce the reflectivity of the display 200 by changing a property of the first set of pixels, such as on the electronic digital display component. For example, apparatus 25 may cause the first set of pixels of the electronic digital display to emit a darker color, have dimmer brightness, and/or the like, relative to the second set of pixels. As such, the reflectivity of the display 200 may be reduced from the perspective of a viewer appears to be reduced or eliminated for those portions aligned with the first set of pixels.

Similar to the visual effects of steam on a mirror, the first portion of the display 200 may appear darker, or cloudier, and the reflective properties may be reduced from the perspective of a viewer. A user may therefore be unable to see a reflection in the first portion, or the visibility or clarity of the reflection may be reduced. Although the first portion of the display may be controlled so as to have the appearance of conventional steam, the first portion of the display may be controlled in other embodiments such that the visual effect of steam has additional visual effects, such as different colors or patterns, e.g., green fog on St. Patricks Day, red fog on Valentines Day, etc.

The apparatus 25, such as the processor, may control the second portion of the display 200 such that the full reflective properties of the display 200 are provided, or such that the reflectivity of the second portion is greater than that of the first portion. In some examples, the reflectivity of the second portion may be unchanged.

The difference in reflectivity of the first and second portions may enable a user in the environment of display 200 to perceive the message. In some examples, the apparatus 25, such as the processor, may cause the reflectivity of the display to change instantly, or near instantly. For example, when the apparatus 25 receives a trigger action indication, the display 200 may be adjusted so that the user sees the appearance of steam as a result of the pixels (at least the first set of pixels if not all of the pixels) of the electronic digital display being driven to have a color that is consistent with steam such that the reflective properties of the reflective element are hidden from the user, and the message "drawn" or "written" therein as a result of the second set of pixels of the electronic digital display that correspond to the message remaining or being driven to return to a transparent state such that the reflective properties of the reflective element are visible. In some examples, after the visual effect of steam is applied as a result of all of the pixels of the electronic digital display being driven to have a color that is consistent with steam, the reflectivity of the second portion may be gradually increased as a result of the second set of pixels of the electronic digital display that correspond to the message being allowed to gradually return to a transparent state such that the reflective properties of the reflective element are visible, thereby providing a visual effect of writing on a steamed mirror. As such, the display 200 may first appear to be completely steamed up, and subsequently, a message may appear.

As another example, the apparatus 25, such as the processor, may cause the reflectivity to change gradually, as if the message is being displayed as is it is "drawn" or "written" in the steam by a finger or other object. For example, the message may be provided via a user input such as a detected motion of a user drawing in the air in the environment of the display 200, or by any other user input described herein. In this regard, apparatus 25, such as the processor, may initially have all of the pixels of the electronic digital display driven to have a color that is consistent with steam and may then gradually increase the number of pixels included in the second portion of the display (and/or gradually decrease the number of pixels included in the first portion of the display) by allowing the second set of pixels of the electronic digital display that correspond to the message to gradually return to a transparent state such that the reflective properties of the reflective element are visible so that the message is provided progressively as the user input is provided. For example, the pixels providing simulated steam may be gradually "drawn over" or "written over" such that the pixels are gradually transitioned from belonging to the first set of pixels to belonging to the second set of pixels, such as in a progressive manner across the length of the message in the same fashion in which the message would be written, e.g., from left to right.

In an example embodiment, writing may be captured frame by frame (e.g., video). In some examples, such as those in which a video of the writing is captured, apparatus 25, such as processor 20, may add visual and sound effects to the video. For example, real steam writing may have distinguishable squeaky sounds. Any of the added effects could be added by apparatus 25 such that when the video is provided via the display, the effects are provided along with the message. In an example embodiment apparatus 25, such as with processor 20, may add a visual effect such that on top of the second portion of pixels (e.g., the removed ones), runny water drops are simulated, for example running from top to bottom of the display.

Following the display of the message and as shown by operation 306, apparatus 25 may include means, such as the processor 20, user interface 22, or the like, for causing the reflectivity to gradually change such that the message provided gradually fades. In this regard, the reflectivity of either the first portion or the second portion may be changed to reduce the differences therebetween so that the message is no longer provided. For example, the apparatus 25 may create the visual effect of the message being "steamed over," or the apparatus 25 may create the visual effect of the steam clearing, such that the message gradually fades. That is, the reflectivity of the first portion and/or second portion may be changed such that the message gradually fades.

For example, the reflectivity of the first portion may gradually increase, such as by driving the pixels of the electronic digital display such that the first set of pixels gradually return to being transparent such that the resulting reflectivity is similar to the reflectivity of the second portion (e.g., within a threshold distance of a measurable or perceivable reflectivity). Thus, the message may no longer be perceived by a user. In this regard, the apparatus 25 may create the visual effect of the steam clearing such that the message fades.

As another example, the reflectivity of the second portion may gradually increase, such that as by driving the second set of pixels to gradually have a color consistent with steam such that the reflectivity is similar to the reflectivity of the first portion (e.g., within a threshold distance of a measurable reflectivity or perceivable reflectivity). In such an example, the apparatus 25 creates the visual effect of the message being "steamed over," such that the message fades and may no longer be perceived by a user.

In some examples, apparatus 25, such as the processor, may cause the message to fade and/or disappear after it has been provided for a predefined amount of time, or in response to a deactivation trigger. For example, the deactivation trigger may include the user leaving the room, such as may be detected by a motion detector or the like, or an elapsed amount of time without activity (e.g., movement) in the environment of the display 200.

FIG. 5 is a flowchart of operations performed by apparatus 25 according to example embodiments. The operations of FIG. 5 may be optionally performed by apparatus 25 to facilitate communication between users and/or devices. For example, as illustrated in FIG. 5, user A may send a simulated message to user B. FIG. 6A illustrates an example display associated with user A (e.g., message sender), and FIG. 6B illustrates an example display associated with user B (e.g., message recipient).

As shown by operation 500, apparatus 25 may include means, such as the processor 20, user interface 22, communication interface 24, memory device 26, or the like, for detecting a user in proximity of the display 200. In this regard, user A, the simulated message sender, may be detected in the environment of the display 200 thereby causing a trigger action to be generated, and may be received and/or accessed by apparatus 25.

As shown by operation 502, apparatus 25 may include means, such as the processor 20, user interface 22, or the like, for creating a simulated steam effect on the display 200, and activating that portion of the user interface that receives user input in the form of a message, such as by starting hand tracking and waiting for a user input. The user A may therefore provide the message by a hand gesture input, as illustrated in FIG. 6A. As user A provides the message, the display 200 is updated as described herein to provide the message. That is, apparatus 25, such as the processor, determines the first and second portions comprising respective first and second sets of pixels as the user input is provided, and causes the reflectivity of the display to change accordingly by appropriately driving the first and second sets of pixels of the electronic display device so that the message is provided. User A may therefore see the message in display 200 as the message is being input via the user interface.

Continuing to operation 504, apparatus 25 may include means, such as the processor 20, communication interface 24, memory device 26, or the like, for storing the message (for example, the pixels in which the simulated steam effect is removed as the input is provided), as an image to storage (e.g., memory device 26, and/or any local or remote storage device). In some examples, the message may be stored as a video providing the message as it is drawn by the hand gesture.

In operation 506, apparatus 25 may include means, such as the processor 20, user interface 22, or the like, for fading out the simulated steam message so that the message is no longer perceivable, such as by driving the first and second sets of pixels of the electronic display device such that the differences therebetween are eliminated, at least gradually.

Operations 510, 512, 514, and 516 may optionally be performed by apparatus 25 to provide the message to user B (e.g., message recipient). In some examples, the operations may be performed such that the message is provided at a display (still referred to as display 200) that is remote from the display 200 via which user A provided the message. In such an example, the user A may indicate an intended recipient user or recipient device. In this regard, a message may be transmitted over any type of network, such as Wi-Fi® or Long-Term Evolution (LTE) network.

As another example, the apparatus 25 may provide the message to user B via the same instance of display 200. For example, user A may provide the simulated message, and the message may be displayed subsequently to user B, such as when user B enters into the environment of the display 200. In some examples, the message provided by user A may remain on the display 200, and user B may later see the message, such as upon entering the environment of display 200. In this regard, user A may provide a message for an anonymous recipient. In some examples, user B may provide further input to cause the message to be removed.

As shown by operation 510, apparatus 25 may include means, such as the processor 20, user interface 22, communication interface 24, memory device 26, or the like, for detecting user B, the message recipient, in proximity to the display 200. In some examples, a trigger action may therefore be generated. In response, as indicated by operation 512, apparatus 25 may include means, such as the processor 20, communication interface 24, memory device 26, or the like, for retrieving the message provided by user A, from storage, such as memory device 26, local memory device or cloud storage.

In operation 514, the apparatus 25 may include means, such as the processor 20, user interface 22, or the like, for creating a simulated steam effect on the display 200 by driving the first set of pixels of the electronic display device to have a color consistent with steam, and providing the message based on the reflectivity of the display 200. As described herein, and further illustrated in FIG. 6B, the apparatus 25, such as the processor, may determine the first portion 440 and the second portion 450 of the display 200, and alter the reflectivity of the display 200 such that the message (e.g., a heart) is provided.

In this regard, the apparatus 25 may be configured for communicating messages between users and/or displays 200, and in some examples may provide an element of surprise for user B, the message recipient. For example, user B may enter the environment or room that includes display 200, and the message may appear in the "simulated steam" display. In some examples, user B may indicate by user input to check for any received messages, and the message(s) may be displayed in response.

At least some example embodiments therefore provide a creative, natural, and realistic method for a user to input a message, and for displaying messages to users. The example embodiments enable users to provide and view messages in the simulated steam so as not to create dirty smudges and/or marks on the display 200, as would otherwise be an issue if the users were to actually write messages in real steam.

As described above, FIGS. 3 and 5 illustrate flowcharts of an apparatus 25, method, and computer program product according to example embodiments of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus 25 employing an embodiment of the present disclosure and executed by a processor 20 of the apparatus 25. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the present disclosure set forth herein will come to mind to one skilled in the art to which these present disclosure pertain having the benefit of the teachings presented in the foregoing descriptions and the associated drawings. Therefore, it is to be understood that the present disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a trigger action indication in response to a trigger action occurring in an environment of a display;
in response to the trigger action indication and based on a message, determining, with a processor, a first portion of the display and a second portion of the display, wherein the second portion of the display corresponds to a representation of the message; and
causing the display to selectively reduce a reflectivity of the display by reducing the reflectivity of the first portion of the display relative to the second portion of the display such that a contrast of reflectivity between the first portion of the display and the second portion of the display provides the representation of the message and the first portion of the display provides a background of the representation of the message.

2. The method according to claim 1, wherein the display is comprised by a smart mirror configured to provide a visual characteristic of steam.

3. The method according to claim 1, wherein the message is determined via a user input provided in the environment of the display.

4. The method according to claim 3, wherein the user input is provided via a detected motion, and the method further comprises modifying the first portion of the display and the second portion of the display such that the display provides the message progressively as the user input is provided.

5. The method according to claim 3, wherein the user input is a voice input.

6. The method according to claim 1, wherein the message is retrieved from a memory device.

7. The method according to claim 1, wherein the message is received via a first user interface prior to the message being provided at the display, and the method further comprises:
retrieving the message from a memory device, wherein the display providing the message is remote from the first user interface via which the message was received.

8. The method according to claim 1, wherein the trigger action comprises a change in temperature, humidity, or any combination thereof in the environment of the display.

9. The method according to claim 1, wherein the trigger action comprises a detected sound.

10. The method according to claim 1, further comprising:
causing the reflectivity of the first portion to gradually change such that the message provided gradually fades.

11. The method according to claim 1, further comprising:
causing the reflectivity of the second portion to gradually change such that the message provided gradually fades.

12. An apparatus comprising: at least one processor, and at least one memory comprising computer program code, wherein the at least one memory and the computer program code are configured to, with the processor, cause the apparatus to at least:
receive a trigger action indication in response to a trigger action occurring in an environment of a display;
in response to the trigger action indication and based on a message, determine a first portion of the display and a second portion of the display, wherein the second portion of the display corresponds to a representation of the message; and
cause the display to selectively reduce a reflectivity of the display by reducing the reflectivity of the first portion of the display relative to the second portion of the display such that a contrast of reflectivity between the first portion of the display and the second portion of the display provides the representation of the message and the first portion of the display provides a background of the representation of the message.

13. The apparatus according to claim 12, wherein the at least one display further comprises an electronic digital display component aligned with the at least one reflective component, wherein the reflectivity of the first portion of the display is reduced by changing a property of the first set of pixels on the electronic digital display component.

14. The apparatus according to claim 12, wherein the display is comprised by a smart mirror configured to provide a visual characteristic of steam.

15. The apparatus according to claim 12, wherein the message is determined via a user input provided in the environment of the display.

16. The apparatus according to claim 15, wherein the user input is provided via a detected motion, and the computer program code is further configured to, with the processor, cause the apparatus to modify the first portion of the display and the second portion of the display such that the display provides the message progressively as the user input is provided.

17. The apparatus according to claim 15, wherein the user input is a voice input.

18. The apparatus according to claim 12, wherein the message is received via a first user interface prior to the message being provided at the display, and the computer program code is further configured to, with the processor, cause the apparatus to:
retrieve the message from the memory, wherein the display providing the message is remote from the first user interface via which the message was received.

19. The apparatus according to claim 12, wherein the trigger action comprises a change in temperature, humidity, or any combination thereof in the environment of the display.

20. A computer program product comprising at least one non-transitory computer-readable storage medium having computer-executable program code instructions stored therein, the computer-executable program code instructions comprising program code instructions to at least:
receive a trigger action indication in response to a trigger action occurring in an environment of a display;
in response to the trigger action indication and based on a message, determine a first portion of the display and a second portion of the display, wherein the second portion of the display corresponds to a representation of the message; and
cause the display to selectively reduce a reflectivity of the display by reducing the reflectivity of the first portion of the display relative to the second portion of the display such that a contrast of reflectivity between the first portion of the display and the second portion of the display provides the representation of the message and the first portion of the display provides a background of the representation of the message.

* * * * *